(No Model.)

J. J. WARRY.
VELOCIPEDE TIRE.

No. 600,187. Patented Mar. 8, 1898.

Witnesses.
H. van Oldenneel
E. A. Scott

Inventor.
James Joseph Warry
by Richards R
Attorneys

THE NORRIS PETERS CO., PHOTO-LITHO., WASHINGTON, D. C.

UNITED STATES PATENT OFFICE.

JAMES J. WARRY, OF BIRKENHEAD, ENGLAND.

VELOCIPEDE-TIRE.

SPECIFICATION forming part of Letters Patent No. 600,187, dated March 8, 1898.

Application filed July 13, 1896. Serial No. 599,005. (No model.) Patented in England October 23, 1895, No. 19,909; in France June 26, 1896, No. 257,598; in Belgium June 27, 1896, No. 122,257; in Austria August 12, 1896, No. 46/3,147; in Canada September 26, 1896, No. 53,589; in Italy December 31, 1896, XXXII, 43,239, and LXXXIV, 466; in Norway January 4, 1897, No. 5,533; in New South Wales January 4, 1897, No. 7,169; in Victoria January 4, 1897, No. 13,833, and in New Zealand January 14, 1897, No. 9,194.

*To all whom it may concern:*

Be it known that I, JAMES JOSEPH WARRY, a subject of the Queen of Great Britain, residing at Birkenhead, in the county of Chester, England, have invented certain new and useful Improvements in Velocipede-Tires, of which the following is a specification.

This invention has reference to velocipede and other wheel tires of the pneumatic type—namely, tires within which air under pressure is employed.

This invention has been patented in the following countries: Austria, No. 46/3,147, dated August 12, 1896; France, No. 257,598, dated June 26, 1896; Belgium, No. 122,257, dated June 27, 1896; Canada, No. 53,589, dated September 26, 1896; New South Wales, No. 7,169, dated January 4, 1897; Victoria, No. 13,833, dated January 4, 1897; New Zealand, No. 9,194, dated January 14, 1897; Italy, No. XXXII, 43,239, LXXXIV, 466, dated December 31, 1896; England, No. 19,909, dated October 23, 1895, and Norway, No. 5,533, dated January 4, 1897.

According to this invention the tire consists of a single band which when in place takes the shape in cross-section of an arch or tube of any desired form and has at each side a tubular extension which fits within an inwardly-turned edge, forming a channel provided at each edge of the rim, and these tubular extensions communicate with the interior of the tire, so that when the tire is inflated the air passes from the main tube into the said tubes and they expand outward and fill said channels' edges and so hold the tire in the rim, and, further, the tire is made of a construction which renders it capable of being opened readily by having overlapping edges on the part of the tire which comes against the rim, which edges are cemented together in such a manner that they can be readily drawn apart should access to the interior of the tire be necessary.

The invention will now be described with reference to the accompanying drawings, in which—

Figure 1:
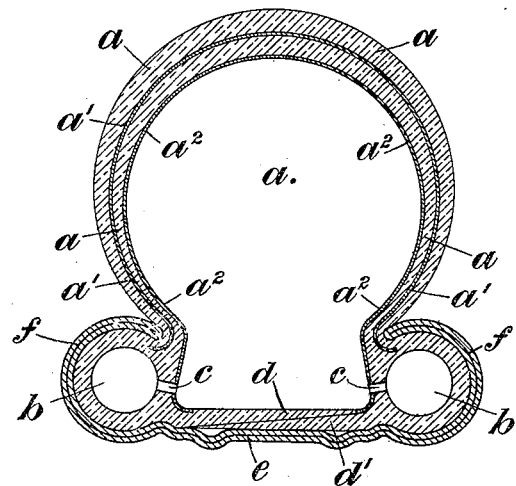
Figure 2:
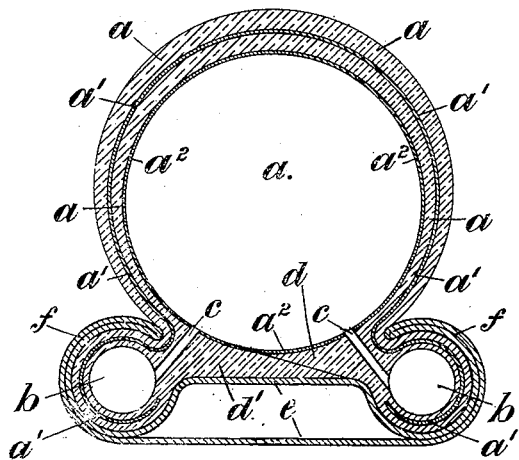

Figure 1 is a cross-section of the tire, and Fig. 2 is a cross-section of a modified form of same.

$a$ is the main arched portion of the tire.

$b$ are the side tubes, by which the tire is held in the rim.

$c$ are the passages connecting the interior of the tubes $b$ with the interior of the part $a$, and $d\ d'$ are overlapping edges of the part $a$.

The rim is designated $e$, and the side channels in which the tubes $b$ fit are marked $f$.

To give the part $a$ the requisite strength and to prevent it from expanding when under pressure, it is provided with canvas linings $a'$ $a^2$, the lining $a'$ being carried on somewhat into the tubes $b$—namely, to a distance just beyond and under the edges of the channels $f$; but the tubes $b$ are without canvas, being simply of rubber, and are therefore capable of being expanded when filled with air under pressure and contracting when the pressure is removed.

The overlapping edges $d\ d'$ are cemented together by india-rubber solution or like cement, and when so joined the tire forms a complete and closed tube from which no air can escape; but if at any time it is desired to have access to the interior of the tire—i. e., the part $a$—then these two edges $d\ d'$ can be readily torn away from one another by the hand, as the cement or solution, although it will make an air-tight joint between these edges by reason of such edges not being under stretch and resting on the bottom of the rim $e$ and with the air-pressure on the inside pressing them one onto the other, will easily give way when the tire is deflated and the edges $d\ d'$ drawn away from one another.

In using the tire it is placed in the rim $e$, with the tubes $b$ in the channels $f$, and then blown up or inflated, as usual, through a tube and valve of any suitable kind, the effect being that as the air increases its pressure in the tire it flows into the tubes $b$ through the holes $c$ and inflates them so that they fill the channels $f$ and bear firmly against the inner surface thereof.

By this construction I provide a cheap and simple tire consisting of a single tube—i. e., without an inner tube—having side tubular fastenings with the rims, which are filled from the interior of the tire, and having overlapping edges at the bottom which, though normally closed and sealed, can readily be drawn apart and the interior of the tire reached.

What I claim is—

1. A tire consisting of a single tube or case, having at each side a projecting tubular edge connected with the interior of the body of the tire, that is pneumatically in free communication therewith, and overlapping edges detachably cemented or adhered together and a rim having tubular grooves at each edge in which the tubular side projections fit.

2. A tire consisting of a single tube or case, having at each side a projecting tubular fastening edge, a rim having at each side a groove or channel adapted to receive and hold said tubular edges, and a floor or part extending between said grooves or channels, and said tire having overlapping edges beyond the tubular projections, said edges being sealed together and resting upon a solid floor or part of the rim between the fastening grooves or channels thereof.

3. A tire consisting of a single tube or case, comprising the body $a$, projecting tubular fastening edges $b$, passages $c$ connecting the interior of $a$ with $b$, detachably-sealed overlapping edges $d\ d'$ resting upon the floor or body of the rim, and a rim $e$ with side channels $f$, in which the tubular projections $b$ fit.

In testimony whereof I have hereunto set my hand in presence of two subscribing witnesses.

JAMES J. WARRY.

Witnesses:
ERNEST R. ROYSTON,
JOHN H. WALKER.